United States Patent [19]
Dzida

[11] 4,343,205
[45] Aug. 10, 1982

[54] DIFFERENTIAL

[75] Inventor: Jan Dzida, Bielsko-Biala, Poland

[73] Assignees: Politechnika Lodzka, Lodz; Fabryka Samochodow Rolniczych "POLMO", Poznan, both of Poland

[21] Appl. No.: 132,022

[22] Filed: Mar. 20, 1980

[30] Foreign Application Priority Data

Mar. 22, 1979 [PL] Poland ..................... 214348

[51] Int. Cl.³ ..................... F16H 1/44; F16H 1/40
[52] U.S. Cl. ..................... 74/711; 74/710.5; 74/713
[58] Field of Search ............... 74/711, 710.5, 713, 74/710

[56] References Cited

U.S. PATENT DOCUMENTS

| | | | |
|---|---|---|---|
| 2,234,591 | 3/1941 | Fitzner | 74/711 |
| 3,324,744 | 6/1967 | Roper | 74/711 |
| 3,392,601 | 7/1968 | Roper | 74/711 |
| 3,430,519 | 3/1969 | Roper | 74/711 |
| 3,437,186 | 4/1969 | Roper | 74/711 X |
| 3,546,968 | 12/1970 | Altmann | 74/710.5 |
| 3,994,375 | 11/1976 | Stritzel | 74/710.5 |
| 4,077,279 | 3/1978 | Goscenski, Jr. | 74/711 |
| 4,163,400 | 8/1979 | Fisher et al. | 74/710 |
| 4,263,824 | 4/1981 | Mueller | 74/710.5 |

FOREIGN PATENT DOCUMENTS

| | | |
|---|---|---|
| 233974 | 10/1964 | Austria . |
| 17098 | 3/1980 | European Pat. Off. ........ 74/711 |
| 1625044 | 2/1970 | Fed. Rep. of Germany . |
| 2016710 | 10/1971 | Fed. Rep. of Germany .... 74/710.5 |
| 1367596 | 9/1974 | United Kingdom . |

OTHER PUBLICATIONS

"Mosty Napedowe", by Z. Jaskiewicz, Warsaw, 1977, p. 214.

Primary Examiner—Leslie Braun
Attorney, Agent, or Firm—Ladas & Parry

[57] ABSTRACT

The differential with the moment of inner friction being variable in function of the ratio of rotational speeds of the driven axle shafts is equipped with a multiple-disc friction clutch, the outer hub (1) whereof, constituting a part of the differential housing, is connected with the inner hub (2) over inner friction discs (3) and outer friction discs (4) outside whereof the helical compression springs (5) are installed axially. Inside the inner hub (2) on the axle shaft (6) a polygonal sleeve (7) is mounted non-rotatively in such way that between its walls and the inner cylindrical surface of the hub (2) rollers (8) are disposed with an axial play, sustained by the cage (9) and its centering device (10) in a position symmetrical in relation to the walls of the polygonal sleeve (7). The flange of the cage (9) contacts with the pressure plate (11) connected with tappets (12) disposed uniformly on the periphery, the other ends whereof contact with the crown cam (13) fitted non-rotatively in relation to the axle housing (14). With the tappets (12) the disc (15) is connected, and between it and the housing tension springs (16) are installed.

1 Claim, 3 Drawing Figures

DIFFERENTIAL

This invention relates to a differential with inner friction forces being variable as a function of the ratio of rotational speeds of the driven axle shafts, adapted especially for axles of vehicles.

There are known differentials with increased inner friction in order to increase the tractive adhesion up to the limit achievable with a rigid axle.

The known differentials of the firm Rockwell-Standard Corporation, Automative Division, Detroit, Michigan, and differentials manufactured by Eaton Corporation, having a constant moment of inner friction, are provided with a multiple disc clutch installed between the axle shaft and the planet pinion cage.

There are also known differentials with multiple disc clutch, having inner friction forces dependent on the moment onto the crown wheel of the final drive, manufactured among others by the firms Power-Lok Corporation and Oldsmobile Division of the concern GMC.

A disadvantage of known differentials is the proportionality of the additional moment of friction to the torque transmitted by the final drive. That causes a low effectiveness of said designs under conditions of bad tractive adhesion, when the moment on the differential housing is low, and the cornering takes place at unsymmetrical distribution of the driving torques onto the wheels, which makes difficult the steering of the vehicle.

An object of the invention is such a design of the differential, which provides, in the case of a spin of one of the drive wheels, in the differential a high moment of inner resistance arises, causing thus an increase of the tractive adhesion, whereby the value of said moment can be controlled by the actual values of kinematic parameters of the differential elements.

The differential according to the invention is provided with a multiple-disc friction clutch, the outer hub whereof, constituting a part of the differential housing, is connected with the inner hub over the inner and the outer friction discs, outside whereof helical compression springs are arranged coaxially. Inside the inner hub on the axle shaft a polygonal sleeve is non-rotatively mounted in that way that between its walls and the cylindrical surface of the inner hub rollers are disposed with a radial clearance, sustained by the cage and its spring-loaded centering device in a flexible way in a position symmetrical to the walls of the polygonal sleeve. Moreover the cage has a friction portion, preferably conically formed, with a flange, said portion being fitted in a conical hole in the differential housing. The cage flange contacts with the pressure plate being connected with, preferably two, tappets disposed uniformly on the periphery, the other ends of which contact with a crown cam fitted non-rotatively in relation to the axle housing, the front face of said cam being provided with recesses disposed uniformly on the periphery in a number equal to that of the tappets. Outside the differential housing a disc is installed connected with the tappets, and between said disc and the housing tension springs are fitted.

In course of straight on drive the differential housing and the axle shaft rotate with equal speeds, wherewith also the polygonal sleeve, the rollers, the cage, and the pressure plate rotate, whereby said pressure plate, beyond the rotational motion, performs also small axial motions caused by the co-operation of the tappets with the front face of the crown cam. Said motions cause periodical frictional contacts of the cage with the housing in order to impart to the cage, during such a contact, an angular speed equal to the speed of the differential housing. In course of cornering, the cage together with the rollers turns by a certain angle against the polygonal sleeve, but the geometrical dimensions of the cam and of the radial clearance of the rollers are so matched that said angle is to small for a wedging of the roller. In the case of exceeding of the limit value of the ratio of rotational speeds of driven axle shafts, which can occur only at a substantial spin of one wheel, the cage together with the rollers turns in relation to the polygonal sleeve by such an angle which causes a seizing of the rollers and coupling the axle shaft over the multiple-disc friction clutch with the housing of the differential, corresponding to an increase of the moment if inner friction in the differential. The disengaging of the multiple-disc friction clutch follows as a result of the change of the transmission direction of the torque which causes the withdrawal of the roller from the wedged position and assuming thereby a position symmetrical to the surfaces of the polygonal sleeve, imparted by the spring-loaded centering device.

The differential according to the invention provides the advantages of a conventional differential, which means it transmits approximately equal driving forces onto both wheels under the conditions of normal operation, and has advantages of a differential with considerably increased inner friction in case of a loss of tractive adhesion by one wheel, since the moment of the inner friction increases stepwise, providing a better utilization of the tractive adhesion of the vehicle driving wheels. Instead, a temporary increase of the inner friction causes a low wear of the device itself, increasing the inner friction, and low wear of the tire. Another advantage of the invention is good steerability of the vehicle, and the fact that the differential functions to control both right and left wheel spin, as well as forward and rearward drive.

The invention will be now described by means of an exemplary embodiment with reference to the accompanying drawing wherein.

Figure 1:
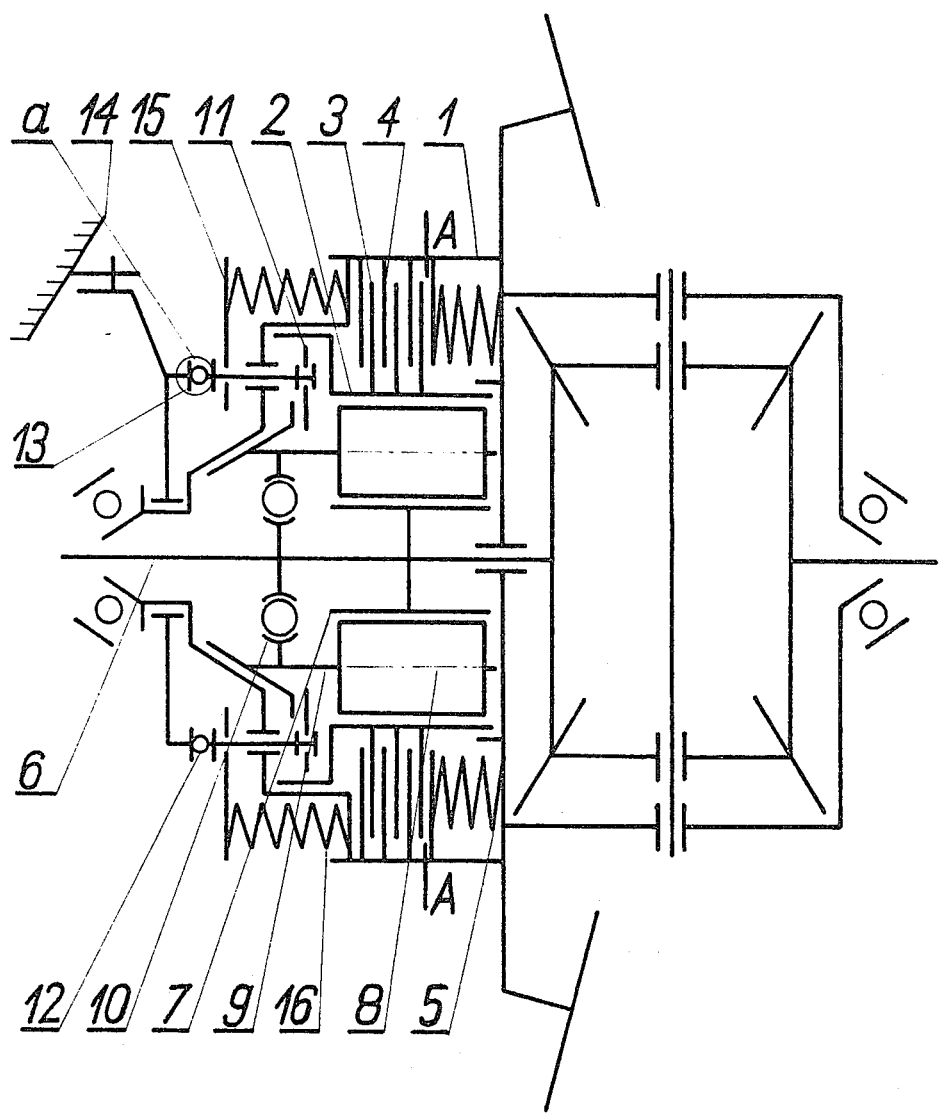
FIG. 1 is a schematical axial-sectional view of the differential.
Figure 2:
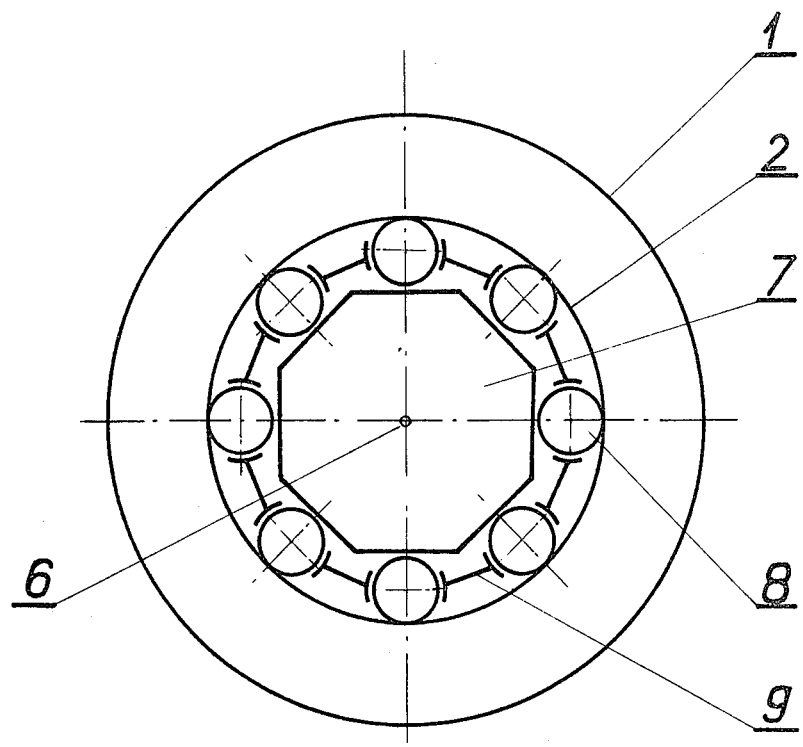
FIG. 2 is the schematical sectional view taken along A—A after FIG. 1.
Figure 3:
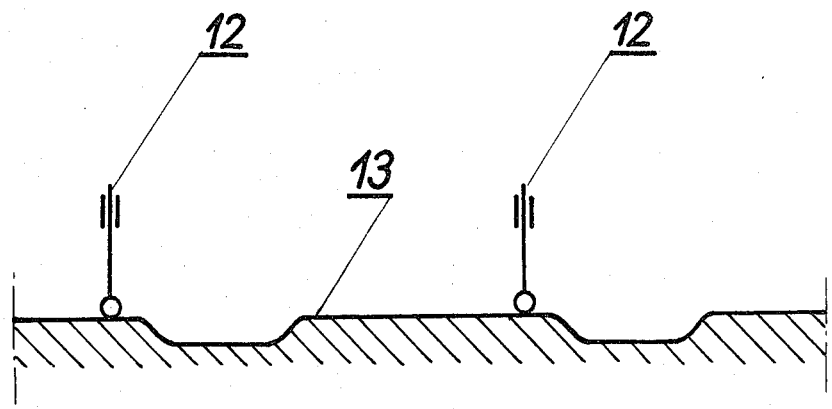
FIG. 3 is a schematic development of the detailed denoted "a" in FIG. 1.

The differential according to the invention is equipped with a multiple-disc frictional clutch, the outer hub 1 whereof, constituting a part of the differential housing, is with the inner hub 2 coupled over the inner friction discs 3 and the outer friction discs 4, outside whereof there are fitted axially the helical compression springs 5. Inside the inner hub 2, on the axle shaft 6 is mounted non-rotatively the polygonal sleeve 7 in such way that between its walls and the inner cylindrical surface of the hub the rollers 8 are disposed with an radial clearance, being sustained by the cage 9 and its centering device 10 in the position symmetrical in relation to the walls of the polygonal sleeve 7. Moreover, the cage 9 has a preferably conically shaped friction portion with a flange, fitted in a conical recess in the housing of the differential. The flange of the cage 9 contacts with the pressure plate 11 connected with preferably two tappets 12 disposed uniformly around the periphery, the other ends whereof contact with the crown cam 13 mounted non-rotatively in relation to the axle housing 14, the front face whereof is provided with recesses uniformly disposed on the periphery in a number equal to the number of tappets 12. A disc is connected to the tappets, and between said disc and the housing axial tension springs 16 are installed. In case of straight on drive of the vehicle the differential housing and the axle shaft 6 revolve with equal speed, wherewith also there rotate the polygonal sleeve 7, the roller 8, the cage 9, and the pressure plate 11, whereby the pressure plate 11 beyond the rotational motion performs also small axial motions caused by the co-operation of the tappets 12 with the front face of the crown cam 13. Said motion generate only a temporary moment of friction coupling between the housing and the cage 9.

In the case of cornering, in result of temporary moment of friction the cage 9 together with the rollers 8 turns temporarily by a certain angle in relation to the polygonal sleeve 7, the geometrical parameters of the cam 13 and of the radial clearance of the rollers 8 have been so chosen, that said angle is too small for the roller 8 to be wedged against the sleeve. In the case of exceeding of the limit value of the ratio of rotational speeds of the axle shafts being driven, what can occur only in the case of a notable wheel spin of one wheel, the cage 9 together with the rollers 8 turns in relation to the polygonal sleeve 7 by such an angle which causes a wedging of the rollers 8, and coupling of the axle shaft 6 over the multiple-disc friction clutch with the differential housing, resulting in a considerable increase of the moment of inner friction of the differential.

The disengaging of the axle shaft 6 from the hub 2 occurs in result of the change of direction of transferring of the torque over the rollers 8, that is in such a case wherein the wedging forces are overcome. After withdrawing the rollers 8 from the wedged position they assume a position symmetrical to the walls of the polygonal sleeve 7, imparted by the spring-loaded centering device 10.

The differential according to the invention is operative both to control wheel spin of the right-hand and the left-hand wheel, and for forward and backward drive.

What is claimed is:

1. In a differential with inner friction forces being variable as a function of the ratio of rotational speeds of the driven axle shafts, adapted especially for axles of vehicles, comprising multiple-disc friction clutch, having an outer hub, constituting a part of the differential housing, connected with an inner hub over inner friction discs and outer friction discs outside of which axially arranged helical compression springs are mounted, and a roller-type clutch means on the inside of the inner hub including a polygonal sleeve mounted non-rotatively on one axle shaft in such way that between its walls and the inner cylindrical surface of the inner hub a plurality of rollers are disposed with a small radial clearance, said rollers being sustained by a cage the improvements comprising a spring-loaded centering device for the roller clutch means mounted in a flexible way in a position symmetrical in relation to the walls of the polygonal sleeve, said cage having a generally conically shaped friction portion with a radial flange, said portion being engageable in a conical recess in the differential housing, and the radial flange of the cage being adapted to contact an annular pressure plate, said pressure plate being axially urged toward and away from said flange by means of a plurality of axially arranged tappets disposed uniformly around the axle shaft, said tappets having cam follower means on the other ends thereof which contact a crown-shaped annular cam mounted non-rotatively in relation to the axle housing, the front face of said cam being provided with recesses disposed uniformly around the periphery thereof in a number equal to the number of the tappets, the tappets being connected to a thrust disc, said disc and the housing being axially connected by tension springs.

* * * * *